(12) United States Patent
Doers et al.

(10) Patent No.: US 7,836,815 B2
(45) Date of Patent: Nov. 23, 2010

(54) LUBRICANT-COOLED AND WRISTPIN LUBRICATING PISTON

(75) Inventors: Douglas A. Doers, Franklin, WI (US); David D. Driscoll, Milwaukee, WI (US)

(73) Assignee: Deltahawk Engines, Inc., Racine, WI (US)

( * ) Notice: Subject to any disclaimer, the term of this patent is extended or adjusted under 35 U.S.C. 154(b) by 390 days.

(21) Appl. No.: 11/688,285

(22) Filed: Mar. 20, 2007

(65) Prior Publication Data

US 2007/0227350 A1    Oct. 4, 2007

Related U.S. Application Data

(63) Continuation-in-part of application No. 10/514,408, filed as application No. PCT/US03/15560 on May 15, 2003, now abandoned.

(60) Provisional application No. 60/380,637, filed on May 15, 2002.

(51) Int. Cl.
*F01B 31/10* (2006.01)
(52) U.S. Cl. ........................................ 92/159
(58) Field of Classification Search .................... 92/159
See application file for complete search history.

(56) References Cited

U.S. PATENT DOCUMENTS

| 1,404,621 A | 1/1922 | Livingood |
| 1,800,077 A | 4/1931 | Jennings |
| 1,890,914 A * | 12/1932 | Parsons ........................ 92/159 |
| 2,159,989 A | 5/1939 | Hazen et al. |
| 2,843,433 A | 7/1958 | Burnand |
| 3,613,521 A | 10/1971 | Itano |
| 4,011,797 A | 3/1977 | Cornet |
| 4,013,057 A | 3/1977 | Guenther |
| 4,180,027 A | 12/1979 | Taylor |
| 4,635,596 A * | 1/1987 | Nakano et al. ................. 92/189 |
| 6,477,941 B1 | 11/2002 | Zhu et al. |
| 6,491,013 B1 | 12/2002 | Gaiser et al. |
| 2002/0046593 A1 | 4/2002 | Ribeiro et al. |

* cited by examiner

*Primary Examiner*—F. Daniel Lopez
(74) *Attorney, Agent, or Firm*—Michael Best & Friedrich LLP

(57) ABSTRACT

A piston for an internal combustion engine, the engine having a connecting rod coupled to a wristpin, the wristpin being connected to the piston for pivotal movement about an axis, the piston comprising: a top portion and a generally cylindrically-shaped wall portion extending from the top portion, the top and wall portions defining a skirt cavity, the top portion having thereon a downwardly extending projection with a downwardly facing bearing surface for the wristpin, the bearing surface extending in the direction of the axis and defining a portion of a cylinder centered on the axis, and the projection having opposite sides facing the skirt cavity; at least one lubricant passage extending through the projection from one of the opposite sides and over the bearing surface to the other of the opposite sides; and a lubricant opening communicating between the lubricant passage and the bearing surface to supply lubricant to the bearing surface and to the wristpin.

45 Claims, 10 Drawing Sheets

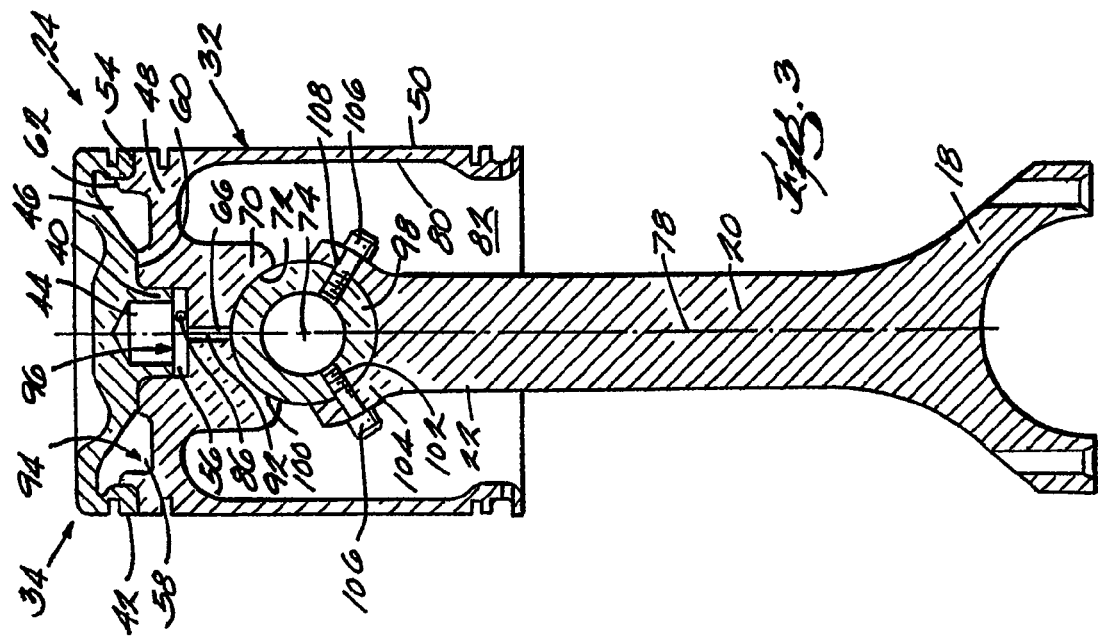
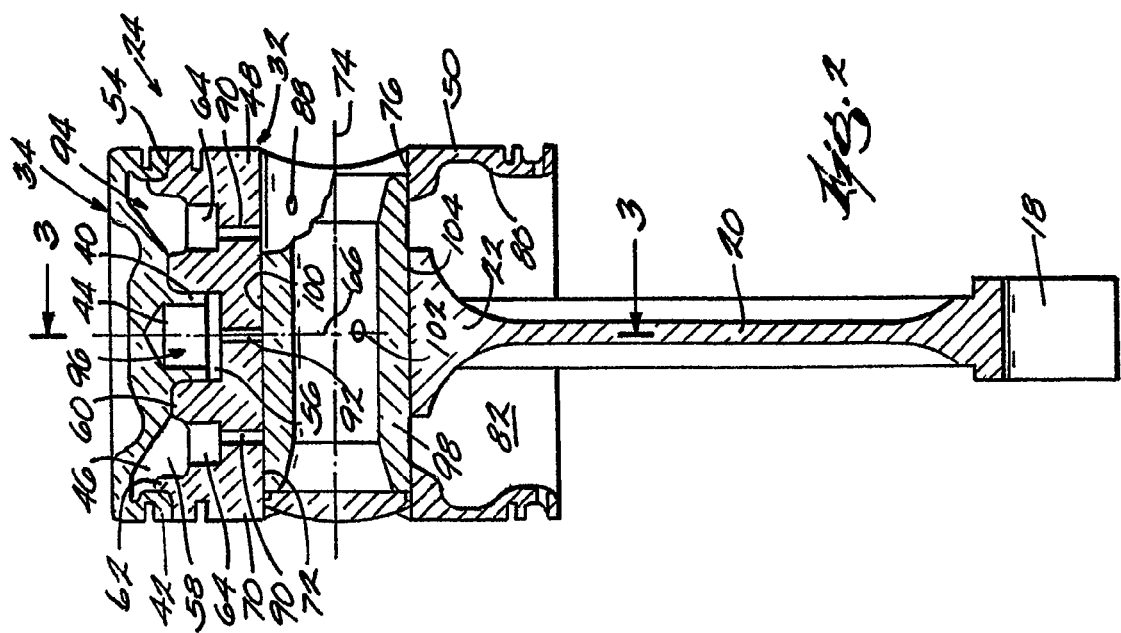

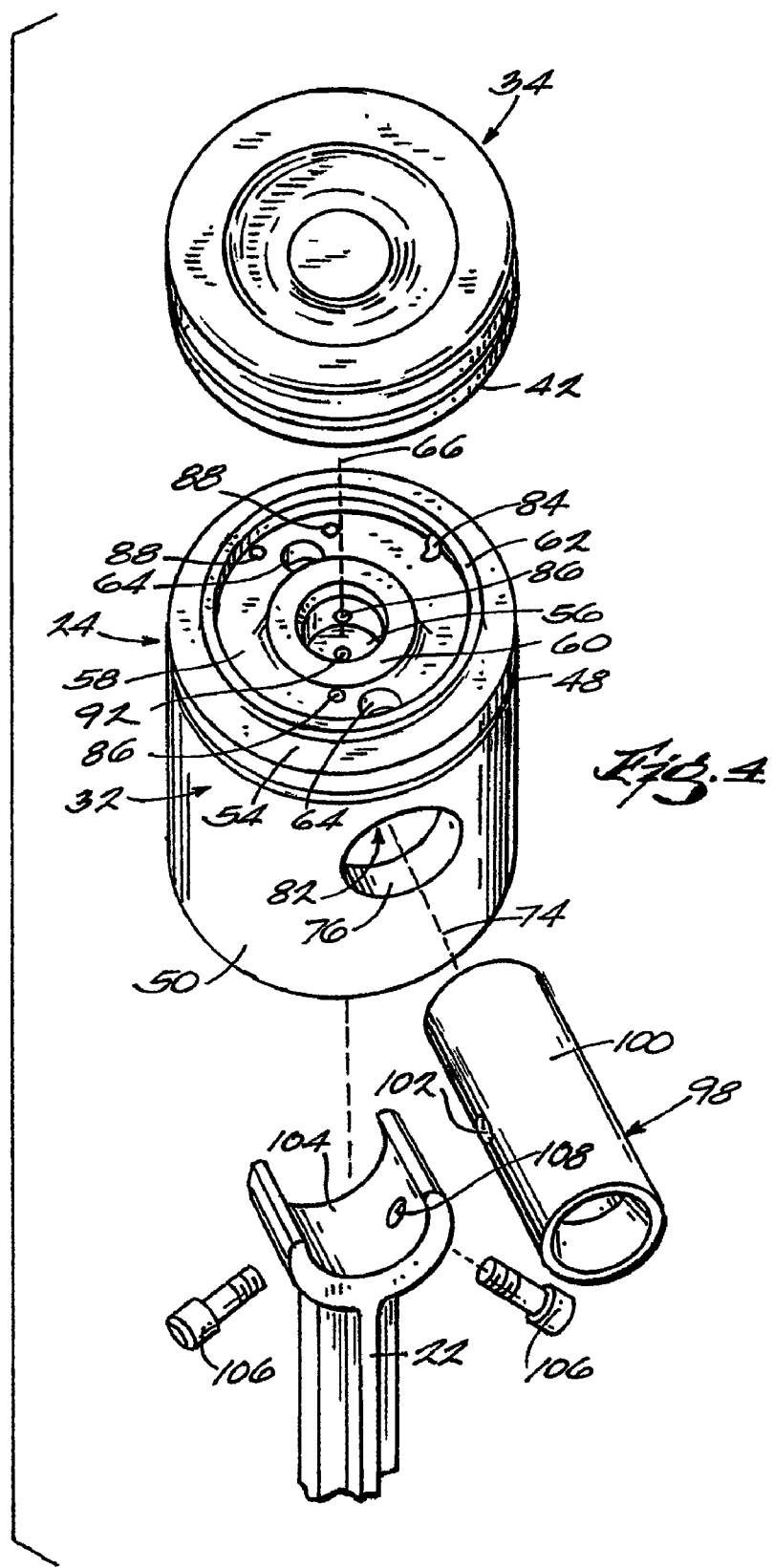

LUBRICANT-COOLED AND WRISTPIN LUBRICATING PISTON

RELATED APPLICATIONS

This application is a continuation-in-part of co-pending U.S. application Ser. No. 10/514,408, filed Jun. 8, 2005, which is a 371 of PCT/US03/15560, filed May 15, 2003, which claims the benefit of U.S. Provisional Application No. 60/380,637, filed May 15, 2002. All of the foregoing are incorporated herein by reference.

FIELD OF THE INVENTION

The invention relates to pistons for internal combustion engines, and more particularly to lubricant cooled pistons for internal combustion engines.

BACKGROUND OF THE INVENTION

Internal combustion engines generally include a piston that is mounted for reciprocation within a cylinder. The piston is coupled to a crankshaft by a connecting rod such that the reciprocation of the piston rotates the crankshaft. One end of the connecting rod is rotatably connected to a crankpin of the crankshaft and the other end of the connecting rod is connected to a wristpin of the piston. The wristpin can be rotatably connected to the piston and rigidly connected to the connecting rod such that the connecting rod and wristpin rotate relative to the piston as the piston reciprocates within the cylinder. Alternatively, the wristpin can be rigidly connected to the piston and rotatably connected to the connecting rod so that the connecting rod rotates relative to the wristpin and the piston as the piston reciprocates within the cylinder.

A number of different methods are used to lubricate the wristpin bearing surface. Typically, a hole drilled in the connecting rod transports lubricant supplied from the crankpin to the wristpin. When the connecting rod is rotatably connected to the wristpin, the hole supplies lubricant directly to the bearing surface between the connecting rod and the wristpin. When the connecting rod is rigidly connected to the wristpin, the hole directs lubricant to a passageway through the wristpin to supply the lubricant directly to the bearing surface between the piston and the wristpin.

It is also known to introduce lubricant into internal passageways within the piston to cool the piston during operation of the engine. Typically, a collimated jet of oil from an injection nozzle is directed into the cooling passageways to remove heat from the piston. In some configurations, the lubricant exits the cooling passageways from the underside of the piston and falls toward the wristpin to assist in lubricating the wristpin bearing surfaces. For example, the top of the connecting rod can include a hole that catches the exiting lubricant and that directs the lubricant to the bearing surface between the connecting rod and the wristpin. Historically, the wristpin has been spaced a distance from the lower surface of the piston and therefore the configurations disclosed in the prior art are incapable of directly lubricating the wristpin bearing surfaces with the lubricant exiting the cooling passages.

SUMMARY OF THE INVENTION

The invention provides a piston for an internal combustion engine, the engine having a connecting rod coupled to a wristpin, the wristpin being connected to the piston for pivotal movement about an axis, the piston comprising: a top portion and a generally cylindrically-shaped wall portion extending from the top portion, the top and wall portions defining a skirt cavity, the top portion having thereon a downwardly extending projection with a downwardly facing bearing surface for the wristpin, the bearing surface extending in the direction of the axis and defining a portion of a cylinder centered on the axis, and the projection having opposite sides facing the skirt cavity; at least one lubricant passage extending through the projection from one of the opposite sides and over the bearing surface to the other of the opposite sides; and a lubricant opening communicating between the lubricant passage and the bearing surface to supply lubricant to the bearing surface and to the wristpin.

The invention also provides a piston for an internal combustion engine, the engine having a connecting rod coupled to a wristpin, the wristpin being connected to the piston for pivotal movement about an axis, the piston comprising: a top portion and a generally cylindrically-shaped wall portion extending from the top portion, the top and wall portions defining a skirt cavity; a downwardly facing bearing surface for the wristpin, the bearing surface extending in the direction of the axis and defining a portion of a cylinder centered on the axis; a lubricant cavity above the bearing surface, the lubricant cavity having therein a trough with a low point extending along a line parallel to the axis, the line and the axis defining a vertical plane; and a lubricant opening communicating between the low point of the trough and the bearing surface to supply lubricant to the bearing surface and to the wristpin.

The invention also provides a piston for an internal combustion engine, the engine having a connecting rod coupled to a wristpin, the wristpin being connected to the piston for pivotal movement about an axis, the piston comprising: a top portion and a generally cylindrically-shaped wall portion extending from the top portion, the top and wall portions defining a skirt cavity, the top portion having thereon a downwardly extending projection having opposite sides facing the skirt cavity, and the projection having a downwardly facing bearing surface for the wristpin, the bearing surface extending in the direction of the axis and defining a portion of a cylinder centered on the axis, the bearing surface having therein a groove extending along a line, the line and the axis defining a vertical plane; at least three lubricant passages each extending through the projection from one of the opposite sides and over the bearing surface to the other of the opposite sides, each passage including a middle, an upwardly facing surface with a first portion that ramps upwardly from the one of the sides toward the middle of the passage, a second portion that ramps upwardly from the other of the sides toward the middle of the passage, a trough located between the first and second portions, the trough having a lowermost central portion extending along a line parallel to the axis and in the vertical plane, and generally parallel ridges on opposite sides of the trough; and at least three lubricant openings, each lubricant opening communicating between the lowermost portion of a respective trough and the groove to supply lubricant to the bearing surface and to the wristpin, the lubricant openings extending in the vertical plane.

The invention also provides a piston for an internal combustion engine, the engine having a connecting rod coupled to a wristpin, the wristpin being connected to the piston for pivotal movement about an axis, the piston comprising: a top portion and a generally cylindrically-shaped wall portion extending from the top portion, the top and wall portions defining a skirt cavity; a downwardly facing bearing surface for the wristpin, the bearing surface extending in the direction of the axis and defining a portion of a cylinder centered on the axis, and the bearing surface having therein a recess; a lubricant cavity above the bearing surface; and a lubricant opening communicating between the lubricant cavity and the recess to supply lubricant to the bearing surface and to the wristpin.

Other features and advantages of the invention will become apparent to those skilled in the art upon review of the following detailed description, claims, and drawings.

BRIEF DESCRIPTION OF THE DRAWINGS

FIG. 2 is a cross-section view taken along line 2-2 of FIG. 1.

FIG. 3 is a cross-section view taken along line 3-3 of FIG. 2.

FIG. 4 is an exploded view illustrating the piston shown in FIG. 1.

FIG. 1 0 is a view taken along line 10-10 of FIG. 8.

Figure 1:
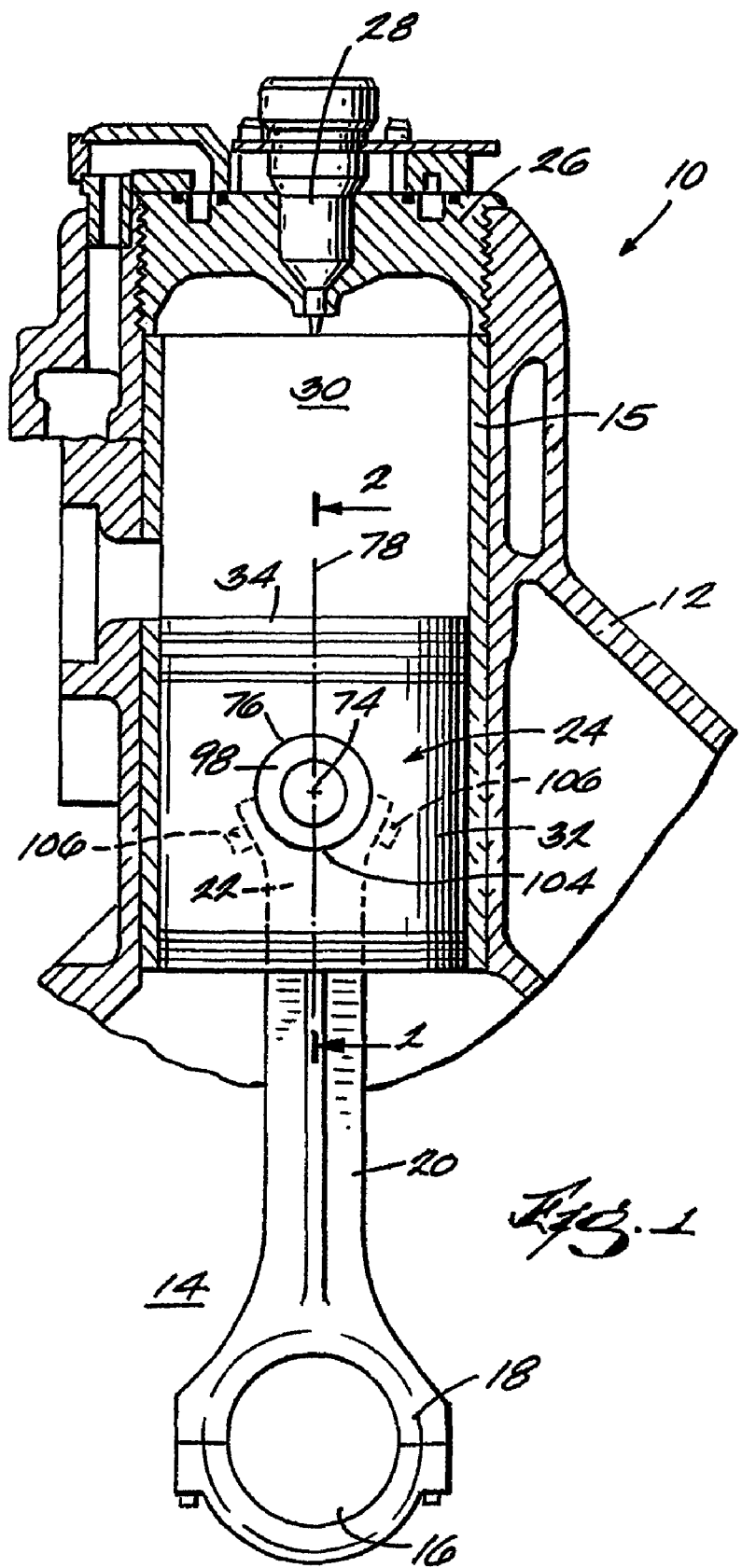
FIG. 1 is a partial cross-section view illustrating an engine having a piston assembly embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a section view of an internal combustion engine 10 in which one embodiment of the present invention is employed. The engine 10 is a two-stroke, diesel aircraft engine, however, it should be understood that the present invention can also be used in other engines.

The engine 10 includes an engine block 12 at least partially defining a crankcase 14 and a cylinder 15. A crankshaft (not shown) is rotatably supported within the crankcase 14 and includes a crank pin 16. One end 18 of a connecting rod 20 is rotatably coupled to the crank pin 16, and the other end 22 of the connecting rod 20 is coupled to a piston 24 located within the cylinder 15 for reciprocation within the cylinder 15. A cylinder head 26 is threadingly engaged to the engine block 12 to cover the cylinder 15. A fuel injector 28 extends through the cylinder head 26 and injects fuel into a combustion chamber 30 defined by the cylinder head 26, the cylinder 15, and the piston 24.

As best illustrated in FIG. 4, the piston 24 includes a skirt 32 and a crown 34 connected to the top of the skirt 32. The crown 34 is generally disc-shaped and includes a top surface configured to correctly direct the motion of the charge from the fuel injector 28 within the combustion chamber 30. With further reference to FIG. 2, the bottom surface of the crown 34 includes a centrally-extending threaded boss 40 and a downwardly-extending flange 42 about the periphery of the crown 34. The boss 40 includes a bore 44, and the bottom surface includes an annular groove 46 between the flange 42 and the boss 40.

Referring back to FIG. 4, the skirt 32 includes a generally disc-shaped top portion 48 and a cylindrical wall 50 extending downwardly from the periphery of the top portion 48. The upper surface of the top portion 48 includes a recessed edge 54 along the periphery, a centrally located threaded bore 56, and an annular groove 58 located between the central bore 56 and the recessed edge 54. A first annular wall 60 separates the annular groove 58 and the central bore 56, and a second annular wall 62 separates the annular groove 58 and the recessed edge 54. The upper surface includes a first recess 64 within the annular groove 58 on one side of a central axis 66 and a second recess 64 within the annular groove 58 on the opposite side of the central axis 66. As shown in FIG. 3, the bottom surface of the top portion 48 includes a raised portion 70 that includes an arcuate bearing surface 72. The bearing surface 72 extends along a longitudinal axis 74 between a first aperture 76 on one side of the wall 50 to another aperture 74 on the other side of the wall 50 (FIG. 2). As shown in FIG. 3, the longitudinal axis 74 defines a longitudinal plane 78, and the interior side 80 of the wall 50 and the lower surface of the skirt 32 define a skirt cavity 82.

Figure 5:
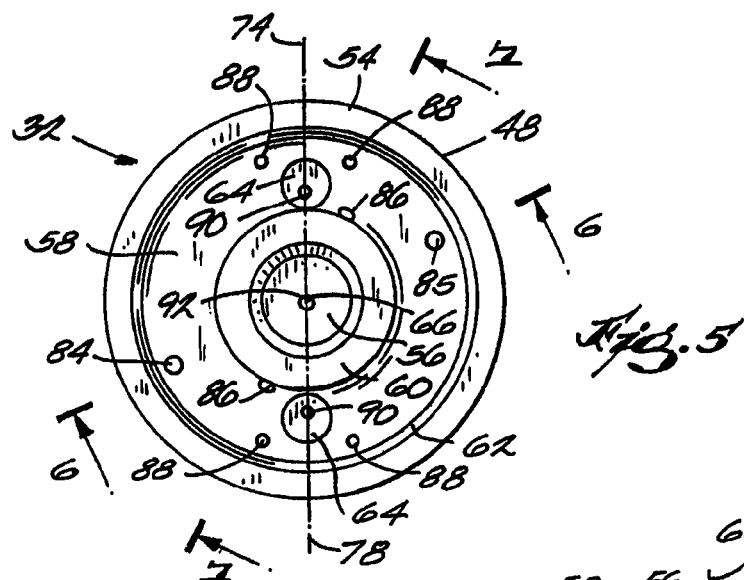
FIG. 5 is a top view of a skirt of the piston shown in FIG. 1.
Figure 6:
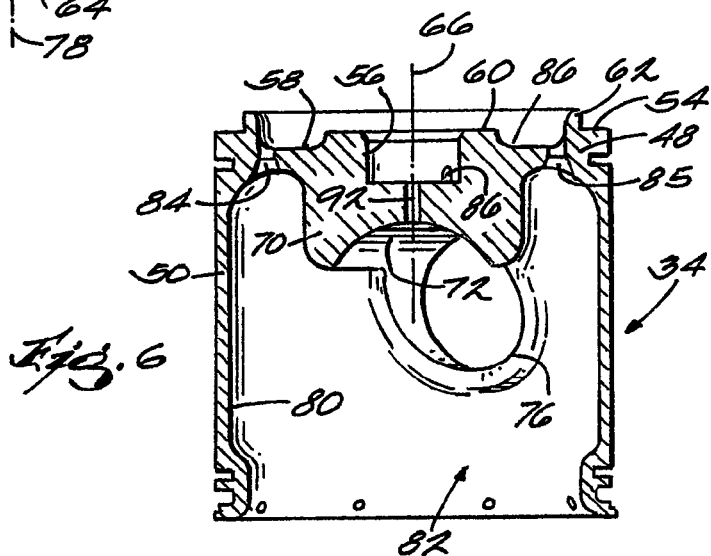
FIG. 6 is a cross-section view taken along line 6-6 of FIG. 5.

Referring to FIGS. 5 and 6, the top portion 48 includes an inlet hole 84 located on one side of the central axis 66 and an exit hole 85 located on the other side of the central axis 66 opposite to the inlet hole 84. The inlet hole 84 and the exit hole 85 extend between the annular groove 58 and the lower surface of the skirt 32 to fluidly communicate between the annular groove 58 and the skirt cavity 82. The inlet hole 84 and the exit hole 85 taper in the direction toward the annular groove 58.

Figure 7:
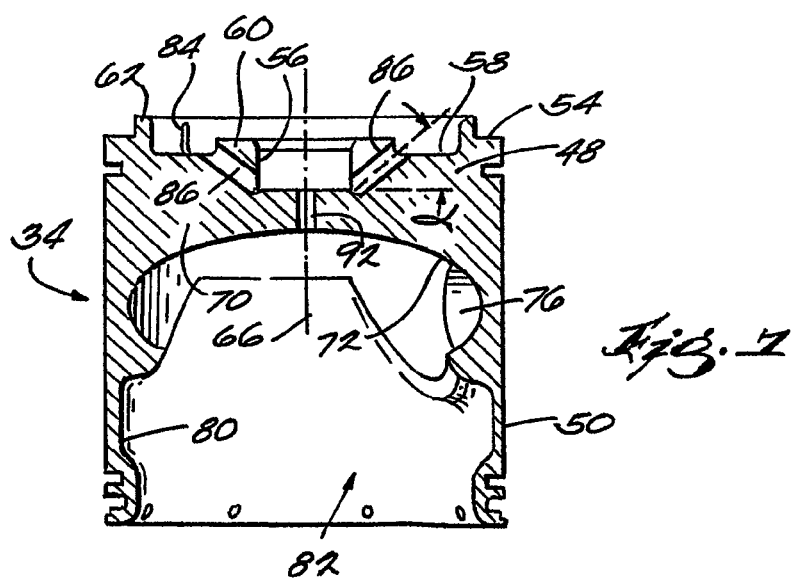
FIG. 7 is a cross-section view taken along line 7-7 of FIG. 6.

Referring to FIGS. 5 and 7, the top portion 48 also includes a first passageway 86 on one side of the central axis 66 and a second passageway 86 located on the other side of the central axis 66 opposite to the first passageway 86. The passageways 86 fluidly communicate between the annular groove 58 and the central bore 56. More specifically, each passageway 86 includes a diameter of 0.187 inches and angles downward from a first end located adjacent to the bottom of the annular groove 58 to a second end located adjacent to the bottom of the central bore 56. As shown in FIG. 7, each passageway 86 defines an angle a, which preferably equals approximately 50 degrees.

As shown in FIGS. 2 and 5, the top portion includes outer lubricating holes 88 located near the annular wall 62. The outer lubricating holes 88 include a first pair on one side of the central axis 66 and a second pair on the other side of the central axis 66 opposite to the first pair. Each pair includes a first outer lubricating hole 88 offset a distance from the longitudinal plane 78 and a second outer lubricating hole 88 offset a similar distance on the opposite side of the longitudinal plane 78. Each outer lubricating hole 88 extends between the bottom surface of the annular groove 58 and the bearing surface 72 to fluidly communicate between the annular groove 58 and the skirt cavity 82.

As shown in FIGS. 2 and 5, the top portion 48 includes two intermediate lubricating holes 90 located within the recesses 64 along the longitudinal plane 78. The intermediate lubricating holes 90 extend between the bottom surface of the recess 64 to the bearing surface 72 to fluidly communicate between the annular groove 58 and the skirt cavity 82.

With reference to FIGS. 2, 3 and 5, the top portion 48 includes a central lubricating hole 92 located within the central bore 56 along the central axis 66 and the longitudinal plane 78. The central lubricating hole 92 extends between the bottom surface of the central bore 56 and the bearing surface 72 to fluidly communicate between the central bore 56 and the skirt cavity 82. Preferably, each of the lubricating holes 88, 90, 92 includes a diameter of approximately 0.125 inches.

As best shown in FIGS. 2 and 3, the crown 34 is connected to the skirt 32 by threading the boss 40 into the bore 56 such that the flange 42 is forced against the recessed edge 54 to form a seal. When the crown 34 and skirt 32 are connected, the annular grooves 46, 58 align to define an annular gallery 94, and the bore 44 combines with the central bore 56 to define a central cavity 96. The illustrated annular grooves 46, 58 are only one example of how the annular gallery 94 could be formed, and other annular galleries formed with annular grooves of varying depths are within the scope of the present invention. Additionally, the annular gallery 94 can be formed entirely by the annular groove of the skirt 32 or the crown 34. Similarly, the central cavity 96 can be formed entirely within the skirt 32, crown 34, or any combination of recesses on the skirt 32 and the crown 34. It should also be noted that the positions of the hollow boss 40 and the bore 56 could be reversed such that the hollow boss 40 is located on the skirt 32 and the bore 56 is located on the crown 34. Other methods of connecting the crown 34 and the skirt 32 to form the annular gallery 94 and the central cavity 96 are known to those skilled in the art and are within the scope of the present invention.

With additional reference to FIG. 4, a wristpin 98 is positioned through both apertures 76 and is rotatably supported by the wall 50. The wristpin 98 is a cylindrical tube having an exterior surface and an interior surface separated by a thickness. The upper portion of the exterior surface defines a bearing surface 100 that is in direct contact with the bearing surface 72. The lower portion of the wristpin 98 includes two holes 102.

The end 22 of the connecting rod 20 includes an arcuate portion 104 that contacts the lower portion of the wristpin 98. The arcuate portion 104 has an arcuate extent that extends about 180 degrees. A plurality of fasteners 106 extend through holes 108 in the arcuate portion 104 and into the holes 102 of the wristpin 98 to secure the wristpin 98 to the arcuate portion 104. The connecting rod 20 and the wristpin 98 could also be connected by extending the fasteners 106 into an annular wristpin insert (not shown) positioned within the wristpin 98 adjacent to the interior surface.

As best illustrated in FIG. 3, because the end 22 of the connecting rod 20 does not encircle the wristpin 98, the bearing surface 100 of the wristpin 98 directly contacts the bearing surface 72 of the skirt 32. This allows the upward forces of the wristpin 98 to be evenly distributed along the entire bearing surface 72 of the raised portion and the downward forces of the piston 24 to be evenly distributed along the entire bearing surface 100 of the wristpin 98. The increased area of the bearing surfaces 72, 100 minimizes uneven wear on the bearing surfaces 72, 100 during operation of the engine 10.

During operation of the engine 10, the piston 24 reciprocates in response to explosions within the combustion chamber 30 thereby rotating the crankshaft through the connecting rod 20. As the piston 24 moves toward the crankshaft, a collimated jet of lubricant is propelled from an injection nozzle (not shown) into the skirt cavity 82 where the lubricant is directed into the inlet hole 84. The lubricant passes through the inlet hole 84 to collect into the annular gallery 94. As the lubricant flows in the annular gallery 94, the lubricant absorbs the heat of the piston 24, thereby removing heat from the piston 24 to cool the piston 24. From the annular gallery 94, the lubricant flows out of the lubrication holes 88, 90, 92, flows into the passageways 86, or flows out of the exit hole 85. The lubrication that flows from the outer lubrication holes 88 flows directly to the bearing surface 72 offset from the longitudinal plane 78 to lubricate the bearing surfaces 72, 100 of the wristpin 98 and the skirt 32. The lubricant that flows from the intermediate lubrication holes 90 flows directly to the bearing surface 72 along the longitudinal plane 78 to lubricate the bearing surfaces 72, 100 of the wristpin 98 and the skirt 32. The recesses 64 within the annular groove 58 accumulate lubricant in order to concentrate flow of lubricant through the intermediate lubrication holes 90 and along the centerline of the bearing surfaces 72, 100, i.e., along the longitudinal plane 78.

The portion of the lubricant that flows through the passageways 86 collects in the central cavity 96. From the central cavity 96, the lubricant flows through the central lubrication hole 92 directly to the center of the bearing surface 72 along the central axis 66 to lubricate the bearing surfaces 72, 100 of the wristpin 98 and the skirt 32.

Lubricant flows directly from the annular gallery 94 of the piston 24 to the bearing surfaces 72, 100 of the wristpin 98 and the skirt 32 to thoroughly lubricate the bearing surfaces 72, 100. This is advantageous over known lubrication systems because known systems expel cooling lubricant from a piston to a wristpin that is spaced a distance from the lower surface of the piston. The distance between the lower surface of the piston and the wristpin makes it difficult to control the flow of the lubricant toward the wristpin bearing surface. In contrast, the lubrication system of the present invention precisely directs the lubricant exiting the piston annular gallery 94 between the bearing surfaces 72, 100 of the wristpin 98 and the skirt 32.

FIGS. 8 through 13 illustrate a piston 200 that is an alternative embodiment of the invention. Except as described below, the piston 200 is substantially identical to the piston 24.

Figure 9:
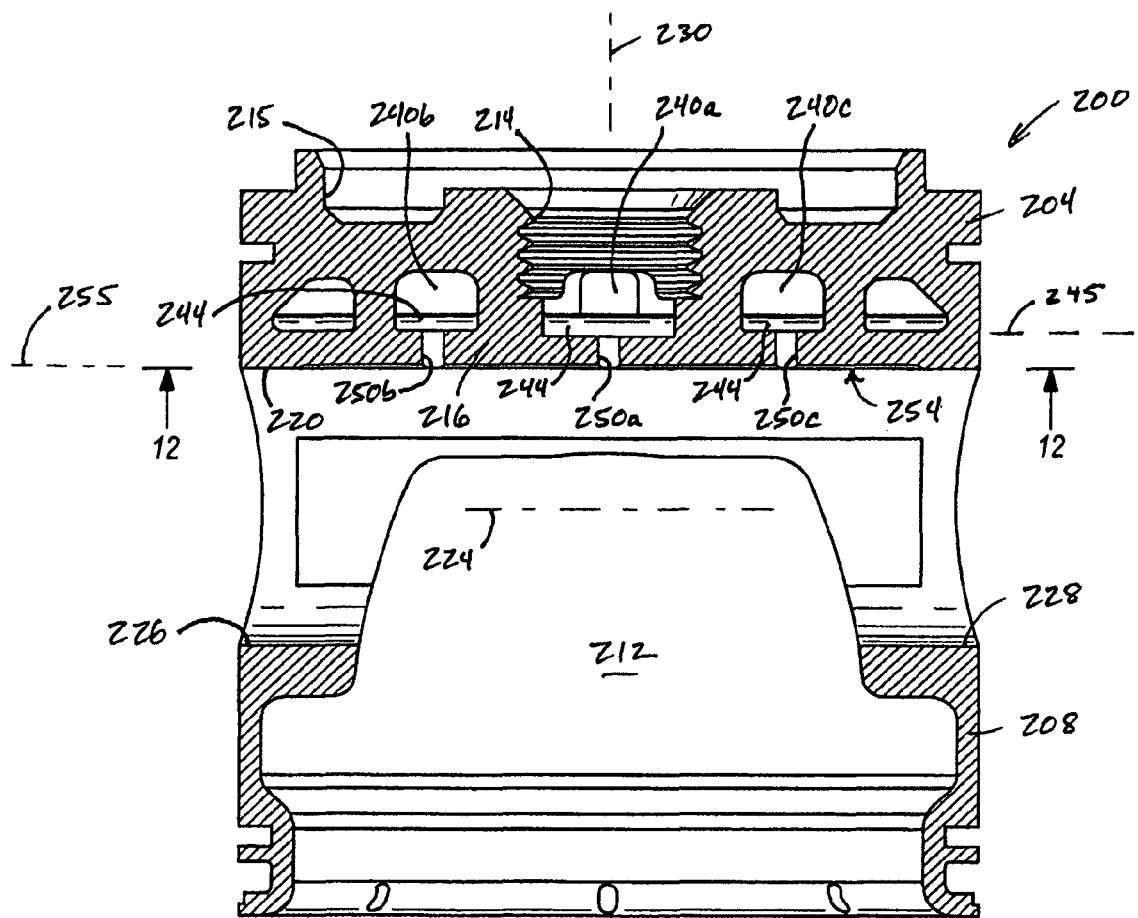
FIG. 9 is a view taken along line 9-9 of FIG. 8.
Figure 10:
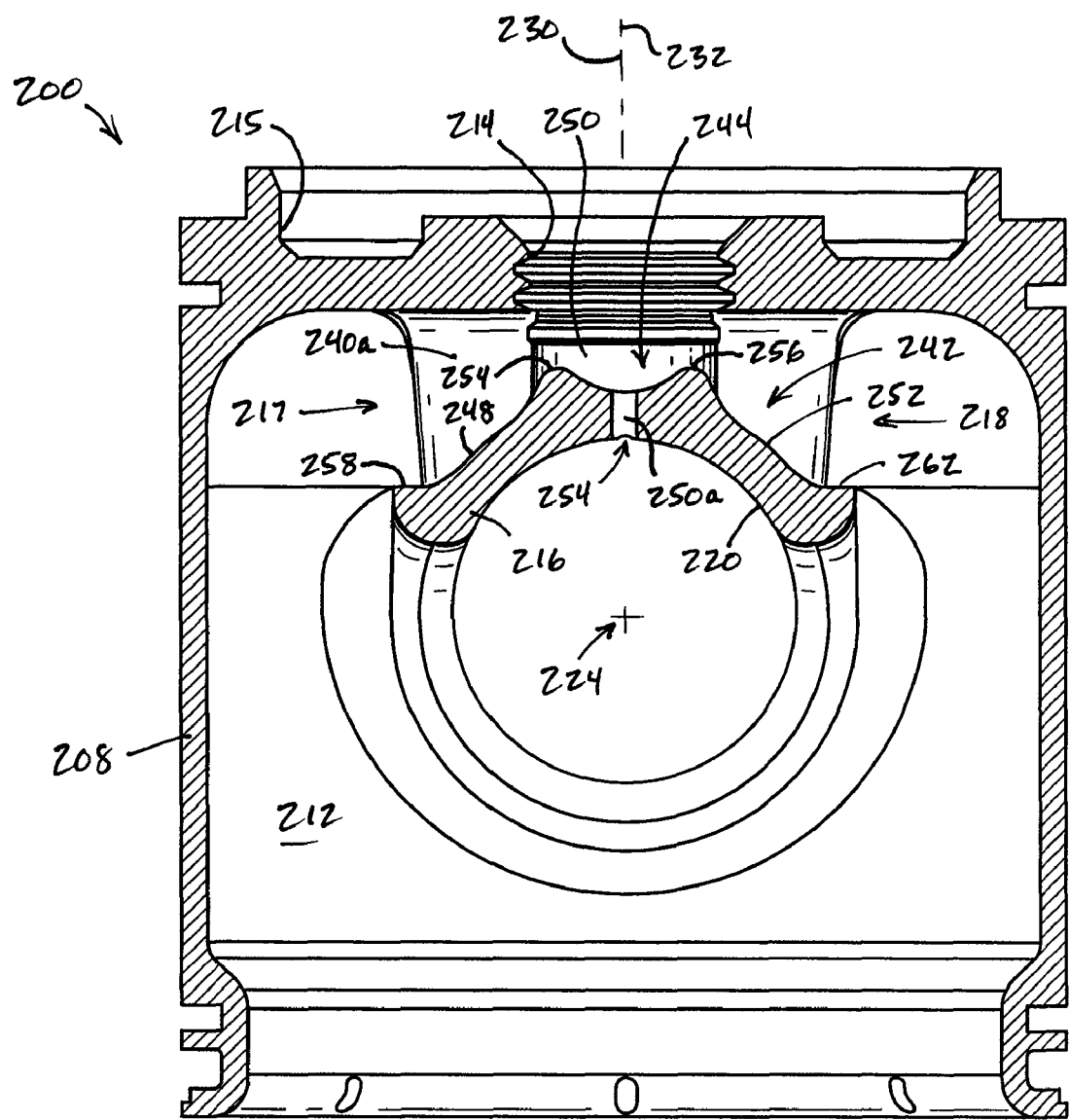
Figure 11:
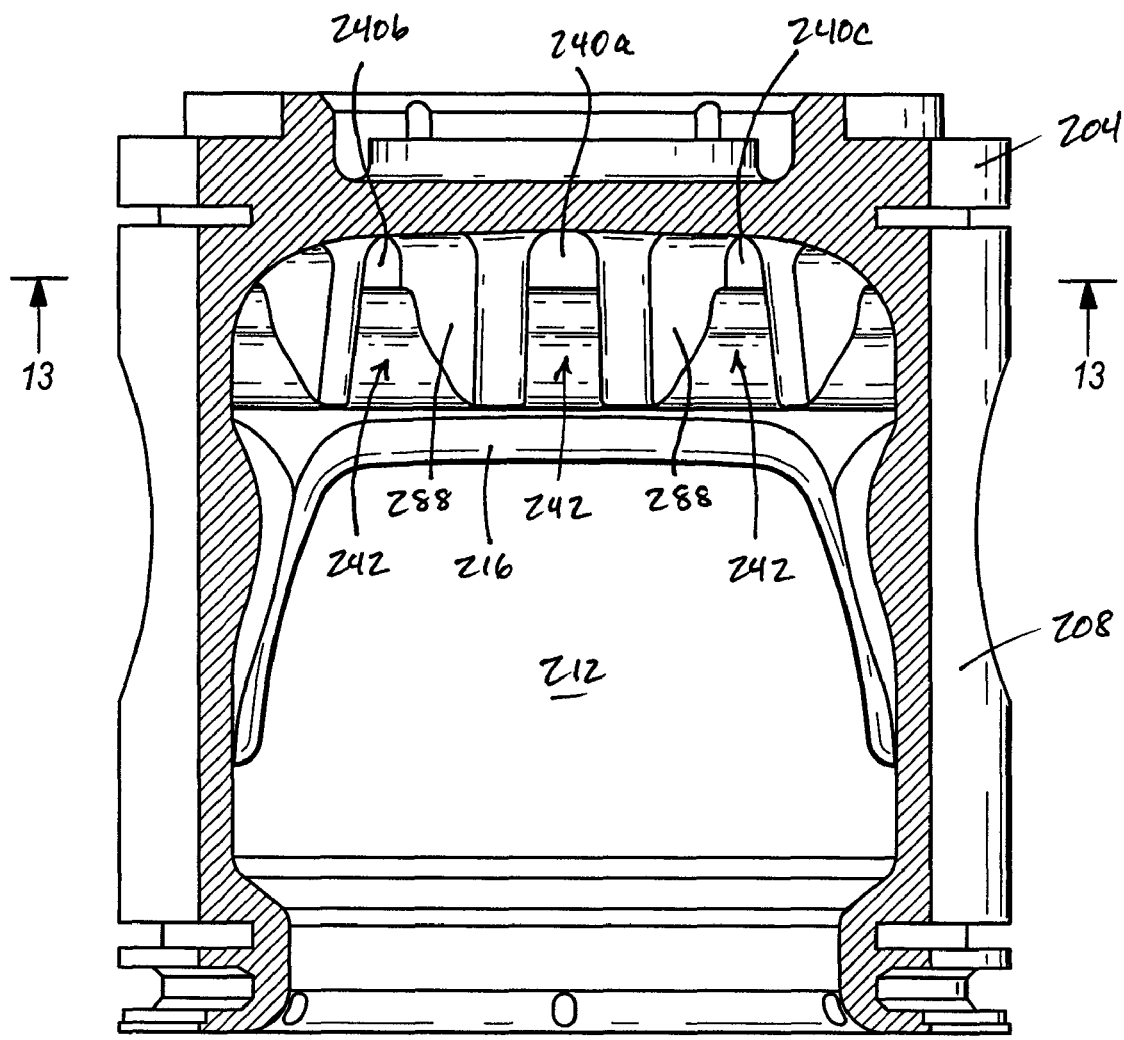
FIG. 11 is a view taken along line 11-11 of FIG. 8.

As best illustrated in FIGS. 9 and 10, the piston 200 includes a generally disc-shaped top portion 204 and a generally cylindrically-shaped wall portion or skirt 208 extending downwardly from the top portion 204. The top and wall portions define a skirt cavity 212. The upper surface of the top portion 204 includes a centrally located threaded bore 214, and an annular groove 215 surrounding the central bore 214. The piston also includes a crown (not shown) substantially identical to the crown 34 of the piston 24. The crown has a bottom surface with a centrally-extending boss threaded into the bore 214. The bottom surface of the top portion 204 includes a downwardly extending projection 216 having (see FIG. 10) opposite right and left sides 217, 218 facing the skirt cavity 212. The projection 216 has a downwardly facing bearing surface 220 for the wristpin (not shown). The bearing surface 220 extends in the direction of a longitudinal axis 224 between (see FIG. 9) an aperture 226 on one side of the wall portion 208 and an aperture 228 on the other side of the wall portion 208. The bearing surface 220 defines a portion of a cylinder centered on the axis 224. The wristpin (not shown) pivots about the axis 224. The piston 200 has a vertical central axis 230 intersecting the axis 224, and the axes 224 and 230 define a plane 232. The plane 232 appears the same as the axis 230 in FIG. 10 and is the plane of the paper in FIG. 9.

Figure 8:
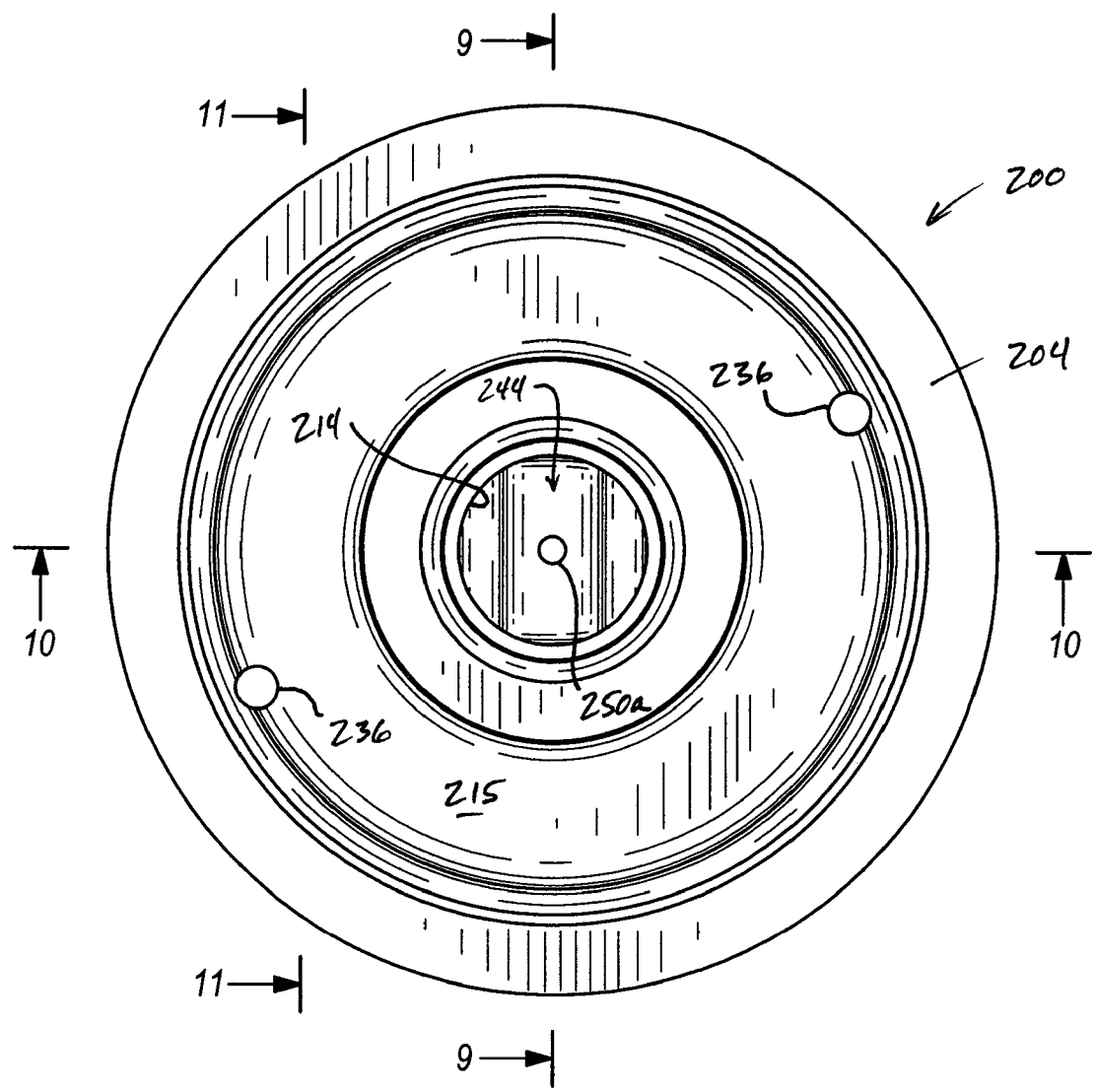
FIG. 8 is a top plan view of a piston that is another embodiment of the invention.
Figure 12:
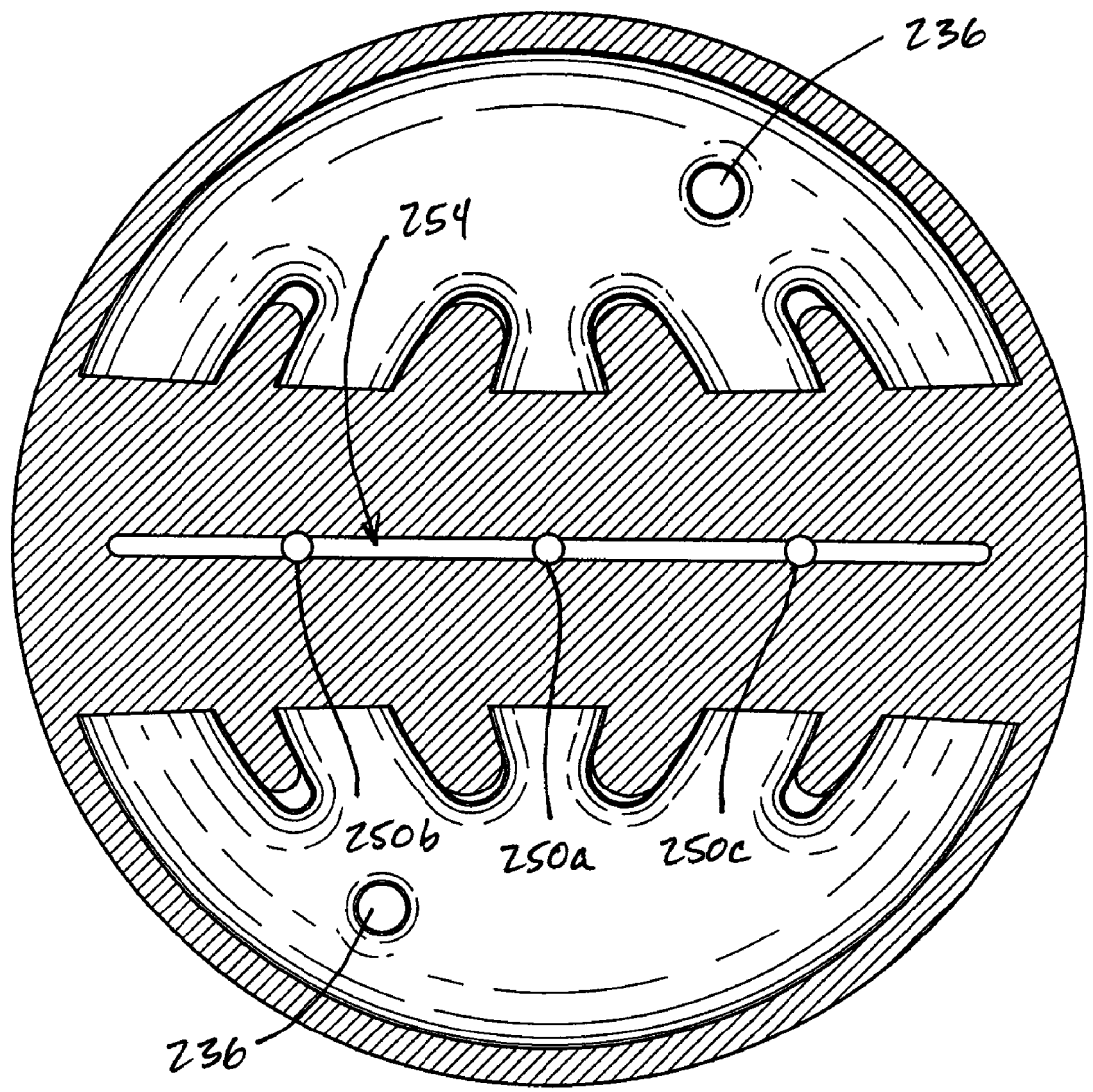
FIG. 12 is a view taken along line 12-12 of FIG. 9.
Figure 13:
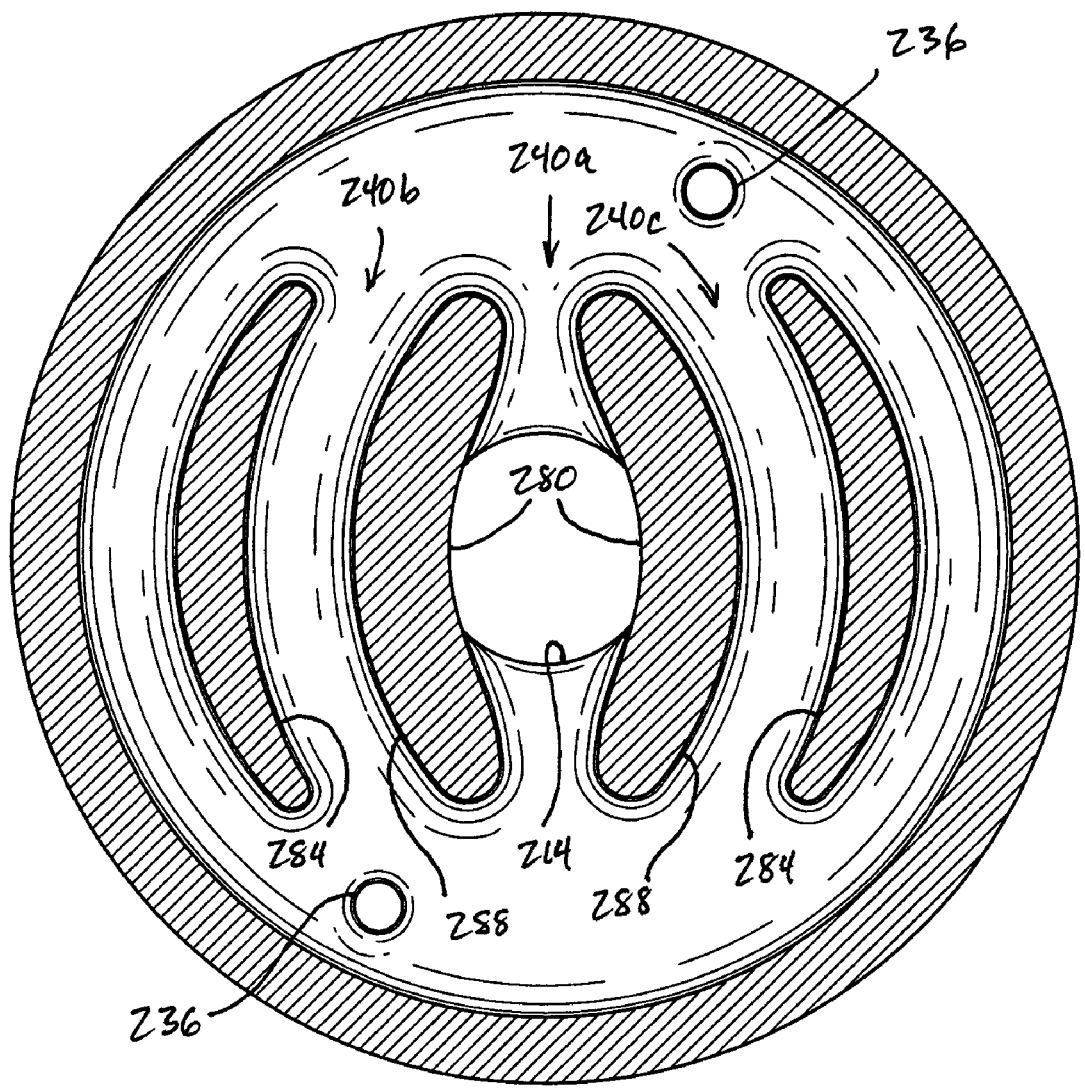
FIG. 13 is a view taken along line 13-13 of FIG. 11.

When the crown is secured to the top portion 204, the annular groove 215 forms an annular chamber 234 which communicate with the skirt cavity 212 via diametrically opposed passages 236 shown in FIGS. 8, 12 and 13. An oil jet or P tube (not shown) shoots oil into the chamber 234 through one of the passages 236 to cool the crown and the top portion of the piston. The oil in the chamber 234 returns to the skirt cavity through the other passage 236.

Three lubricant passages 240a, b and c extend through the projection 216 from one side to the other and over the bearing surface 220. The passage 240a is centrally located, and the passages 240b and c are on opposite sides of the passage 240a. Each lubricant passage 240 includes (see FIG. 10) an upwardly facing surface 242 that includes a central trough 244. The trough 244 of each passage 240 has a lowermost central portion, and extends in the direction of the axis 224, such that the lowermost central portion, or low portion, extends along a line 245 (FIG. 9) that is parallel to the axis 224 and is located in the plane 232.

The upwardly facing surface 242 of each lubricant passage 240 preferably includes (see FIG. 10) a first or left portion 248 that ramps upwardly from the left side of the projection 216 toward the trough 244, and a second or left portion 252 that ramps upwardly from the right side of the projection 216 toward the trough 244. The upward angle of each of the surfaces 248, 252 increases adjacent the trough 244, and the surface 242 forms parallel ridges 254, 256 on opposite sides of the trough 244. The surface portion 248 has a lower end, and a generally horizontal portion 258 extends outward from the lower end of the surface 248. The surface portion 252 has a lower end, and a generally horizontal portion 262 extends outward from the lower end of the surface 252. As best shown in FIG. 13, the central passage 240a extends between opposed, radially inwardly facing concave walls 280, and the outer passages 240b and c each extend between a respective radially inwardly facing concave wall 284 and a respective radially outwardly facing convex wall 288.

As best shown in FIGS. 9 and 10, the low point of each trough 244 communicates with the bearing surface 220 via a respective lubricant opening 250 so that lubricant in each passage 240 is supplied to the bearing surface 220 and to the wristpin. Thus, the piston 200 includes three lubricant openings 250a, b and c, all of which extend vertically and are located in the plane 232. The openings 250a, b and c communicate with the lubricant passages 240a, b and c, respectively. The central opening 250a is located on the central axis 230. The outer openings 250b and 250c are located on opposite sides of the central opening 250a.

As best shown in FIGS. 9 and 12, the bearing surface 220 has therein a relatively shallow groove or recess 254 extending along a line 255 that is parallel to the axis 224 and that is located in the plane 232. The lubricant openings 250 all communicate with the groove 254. The groove 254 is preferably arcuate in cross-section, as shown in FIG. 10, and defines a portion of a cylinder. Communication of the openings 250 with the groove 254 improves the distribution of lubricant over the bearing surface 220.

During operation of the engine, the piston 200 splashes oil or lubricant into the lubricant passages 240a, b and c. While some of the oil passes completely through the passages 240a, b and c, some comes to rest in the troughs 244 and then flows through one of the openings 250a, b and c to the bearing surface 220 to lubricate the bearing surface 220 and the wristpin. The shape of the surfaces 242 has been found to provide the correct amount of lubricant to the bearing surface 220. At the same time, the oil jet or P tube (not shown) shoots oil into the chamber 234 through one of the passages 236 to cool the crown and the top portion of the piston. The oil in the chamber 234 returns to the skirt cavity through the other passage 236.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Also, terms such as "left" or "right" or "vertical" in the above description and in the claims are used only to indicate relative orientation and are not intended to be limiting.

The invention claimed is:

1. A piston for an internal combustion engine, the engine having a connecting rod coupled to a wristpin, the wristpin being connected to the piston for pivotal movement about an axis, the piston comprising:

a top portion and a generally cylindrically-shaped wall portion extending from the top portion, the top and wall portions defining a skirt cavity, the top portion having thereon a downwardly extending projection with a downwardly facing bearing surface for the wristpin, the bearing surface extending in the direction of the axis and defining a portion of a cylinder centered on the axis, and the projection having opposite sides facing the skirt cavity;

at least one lubricant passage extending through the projection from one of the opposite sides and over the bearing surface to the other of the opposite sides; and a lubricant opening communicating between the lubricant passage and the bearing surface to supply lubricant to the bearing surface and to the wristpin.

2. The piston of claim 1, wherein the lubricant passage includes an upwardly facing surface that includes a trough, and wherein the lubricant opening communicates with the trough.

3. The piston of claim 2, wherein the trough has a lowermost central portion, and wherein the lubricant opening communicates with the central portion.

4. The piston of claim 3, wherein the trough extends in the direction of the axis.

5. The piston of claim 4, wherein the trough has a low portion extending along a line parallel to the axis, the line and the axis defining a vertical plane.

6. The piston of claim 1, wherein the bearing surface has therein a recess with which the lubricant opening communicates.

7. The piston of claim 6, wherein the recess is a groove extending in the direction of the axis.

8. The piston of claim 7, wherein the groove extends along a line parallel to the axis, the line and the axis defining a vertical plane.

9. The piston of claim 8, wherein the groove is arcuate in cross-section.

10. The piston of claim 9, wherein the groove defines a portion of a cylinder.

11. The piston of claim 2, wherein the upwardly facing surface also includes a first portion that ramps upwardly from the one of the sides toward the trough, and a second portion that ramps upwardly from the other of the sides toward the trough.

12. The piston of claim 11, wherein the upward angle of each of the first and second portions increases adjacent the trough.

13. The piston of claim 12, wherein the upwardly facing surface forms generally parallel ridges on opposite sides of the trough.

14. The piston of claim 13, wherein the first and second portions of the upwardly facing surface have respective lower ends, and wherein the upwardly facing surface also includes a first generally horizontal portion extending outward from the lower end of the first portion, and a second generally horizontal portion extending outward from the lower end of the second portion.

15. The piston of claim 1, wherein the piston comprises at least three lubricant passages extending through the projection from one of the opposite sides and over the bearing surface to the other of the opposite sides, and at least three lubricant openings, with each lubricant opening communicating between a respective lubricant passage and the bearing surface to supply lubricant to the bearing surface and to the wristpin.

16. The piston of claim 15, wherein the lubricant openings extend vertically and define a plane including the axis.

17. The piston of claim 1, wherein the top portion has therein a threaded central bore for attachment of a crown.

18. A piston for an internal combustion engine, the engine having a connecting rod coupled to a wristpin, the wristpin being connected to the piston for pivotal movement about an axis, the piston comprising:
a top portion and a generally cylindrically-shaped wall portion extending from the top portion, the top and wall portions defining a skirt cavity;
a downwardly facing bearing surface for the wristpin, the bearing surface extending in the direction of the axis and defining a portion of a cylinder centered on the axis;
a lubricant cavity above the bearing surface, the lubricant cavity having therein a trough with a low portion extending along a line parallel to the axis, the line and the axis defining a vertical plane; and
a lubricant opening communicating between the low portion of the trough and the bearing surface to supply lubricant to the bearing surface and to the wristpin, wherein the lubricant cavity communicates with the skirt cavity and includes an upwardly facing surface with a first portion that ramps upwardly toward the middle of the cavity, and with a second portion that ramps upwardly toward the middle of the cavity, and wherein the trough is located between the first and second portions.

19. The piston of claim 18, wherein the trough has a central portion that includes the low portion.

20. The piston of claim 18, wherein the top portion has therein a threaded central bore for attachment of a crown.

21. The piston of claim 18, wherein the upward angle of each of the first and second portions increases adjacent the trough.

22. The piston of claim 21, wherein the upwardly facing surface forms generally parallel ridges on opposite sides of the trough.

23. The piston of claim 22, wherein the first and second portions of the upwardly facing surface have respective lower ends, and wherein the upwardly facing surface also includes a first generally horizontal portion extending outward from the lower end of the first portion, and a second generally horizontal portion extending outward from the lower end of the second portion.

24. The piston of claim 18, wherein the piston comprises at least three lubricant cavities with respective troughs, each trough having a low portion extending along the line parallel to the axis, and the piston also comprising at least three lubricant openings, with each lubricant opening communicating between the low portion of a respective trough and the bearing surface to supply lubricant to the bearing surface and to the wristpin.

25. The piston of claim 24, wherein the lubricant openings extend vertically and in the vertical plane.

26. The piston of claim 18, wherein the bearing surface has therein a recess with which the lubricant opening communicates.

27. The piston of claim 26, wherein the recess is a groove extending in the direction of the axis.

28. The piston of claim 27, wherein the groove extends along a line parallel to the axis, the line being in the vertical plane.

29. The piston of claim 28, wherein the groove is arcuate in cross-section.

30. The piston of claim 29, wherein the groove defines a portion of a cylinder.

31. A piston for an internal combustion engine, the engine having a connecting rod coupled to a wristpin, the wristpin being connected to the piston for pivotal movement about an axis, the piston comprising:
a top portion and a generally cylindrically-shaped wall portion extending from the top portion, the top and wall portions defining a skirt cavity, the top portion having thereon a downwardly extending projection having opposite sides facing the skirt cavity, and the projection having a downwardly facing bearing surface for the wristpin, the bearing surface extending in the direction of the axis and defining a portion of a cylinder centered on the axis, the bearing surface having therein a groove extending along a line, the line and the axis defining a vertical plane;
at least three lubricant passages each extending through the projection from one of the opposite sides and over the bearing surface to the other of the opposite sides, each passage including a middle, an upwardly facing surface with a first portion that ramps upwardly from the one of the sides toward the middle of the passage, a second portion that ramps upwardly from the other of the sides toward the middle of the passage, a trough located between the first and second portions, the trough having a lowermost central portion extending along a line parallel to the axis and in the vertical plane, and generally parallel ridges on opposite sides of the trough; and
at least three lubricant openings, each lubricant opening communicating between the lowermost portion of a respective trough and the groove to supply lubricant to the bearing surface and to the wristpin, the lubricant openings extending in the vertical plane.

32. The piston of claim 31, further comprising a crown coupled to the top portion.

33. The piston of claim 32, wherein one of the crown and the top portion has therein a threaded central bore, and wherein the other of the crown and the top portion has thereon a boss threaded into the bore.

34. The piston of claim 31, wherein the groove is arcuate in cross-section.

35. The piston of claim 34, wherein the groove defines a portion of a cylinder.

36. The piston of claim 31, wherein the upward angle of each of the first and second portions increases adjacent the trough.

37. The piston of claim 36, wherein the first and second portions of the upwardly facing surface have respective lower ends, and wherein the upwardly facing surface also includes a first generally horizontal portion extending outward from the lower end of the first portion, and a second generally horizontal portion extending outward from the lower end of the second portion.

38. A piston for an internal combustion engine, the engine having a connecting rod coupled to a wristpin, the wristpin being connected to the piston for pivotal movement about an axis, the piston comprising:
 a top portion and a generally cylindrically-shaped wall portion extending from the top portion, the top and wall portions defining a skirt cavity;
 a downwardly facing bearing surface for the wristpin, the bearing surface extending in the direction of the axis and defining a portion of a cylinder centered on the axis, and the bearing surface having a length extending parallel to the axis and having therein a recess, the recess extending along more than half of the length of the bearing surface;
 a lubricant cavity above the bearing surface; and
 a lubricant opening communicating between the lubricant cavity and the recess to supply lubricant to the bearing surface and to the wristpin, wherein the piston comprises at least three lubricant cavities, and the piston also comprising at least three lubricant openings, with each lubricant opening communicating between a respective lubricant cavity and the recess to supply lubricant to the bearing surface and to the wristpin.

39. The piston of claim 38, wherein the top portion has therein a threaded central bore for attachment to a crown.

40. The piston of claim 38, wherein the lubricant openings extend vertically and in the vertical plane.

41. The piston of claim 40, wherein the recess is a groove extending in the direction of the axis.

42. The piston of claim 41, wherein the groove extends along a line parallel to the axis, the line being in the vertical plane.

43. The piston of claim 42, wherein the groove is arcuate in cross-section.

44. The piston of claim 43, wherein the groove defines a portion of a cylinder.

45. The piston of claim 38, wherein the recess extends substantially along the entire length of the bearing surface.

* * * * *